United States Patent
Choi

(10) Patent No.: US 10,780,784 B2
(45) Date of Patent: Sep. 22, 2020

(54) METHOD FOR EXECUTING REGENERATIVE BRAKING IN A MILD HYBRID SYSTEM

(71) Applicants: HYUNDAI MOTOR COMPANY, Seoul (KR); KIA MOTORS CORPORATION, Seoul (KR)

(72) Inventor: Kwang-Seok Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/178,136

(22) Filed: Nov. 1, 2018

(65) Prior Publication Data
US 2019/0160952 A1    May 30, 2019

(30) Foreign Application Priority Data

Nov. 29, 2017    (KR) .................... 10-2017-0161691

(51) Int. Cl.
| | | |
|---|---|---|
| *B60L 7/18* | (2006.01) | |
| *B60T 13/58* | (2006.01) | |
| *B60T 1/10* | (2006.01) | |
| *F16D 61/00* | (2006.01) | |

(52) U.S. Cl.
CPC ...... *B60L 7/18* (2013.01); *B60T 1/10* (2013.01); *B60T 13/586* (2013.01); *F16D 61/00* (2013.01); *B60T 2270/60* (2013.01)

(58) Field of Classification Search
CPC ................................................. B60T 2270/60
See application file for complete search history.

(56) References Cited

U.S. PATENT DOCUMENTS

| | | | |
|---|---|---|---|
| 2003/0073538 A1* | 4/2003 | Eguchi ................ | B60K 6/365 |
| | | | 477/45 |
| 2010/0038158 A1* | 2/2010 | Whitney ............... | B60K 6/365 |
| | | | 180/65.265 |
| 2011/0000421 A1* | 1/2011 | Zhang ................. | G01M 13/023 |
| | | | 116/28 R |
| 2015/0155702 A1* | 6/2015 | Yoon ..................... | B60L 1/003 |
| | | | 318/400.21 |

* cited by examiner

Primary Examiner — Imran K Mustafa
(74) *Attorney, Agent, or Firm* — Lempia Summerfield Katz LLC

(57) ABSTRACT

A method for executing regenerative braking of a mild hybrid system may include performing, when a brake is operated while a vehicle having the mild hybrid system is traveling, regenerative braking only in a state in which a wheel torque is greater than a clutch load torque by a threshold, thereby preventing occurrence of an abnormal engine-off state during regenerative braking.

7 Claims, 4 Drawing Sheets

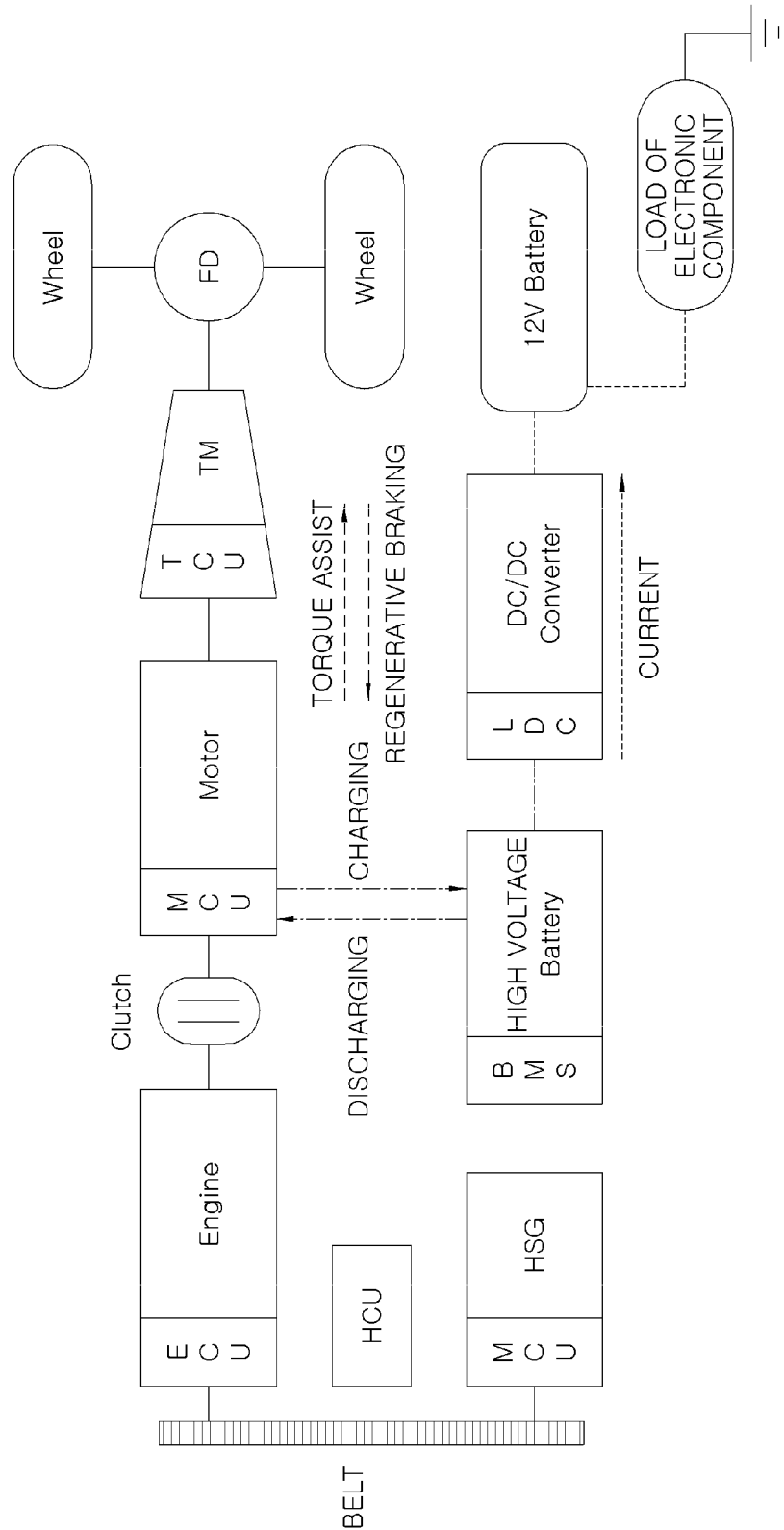

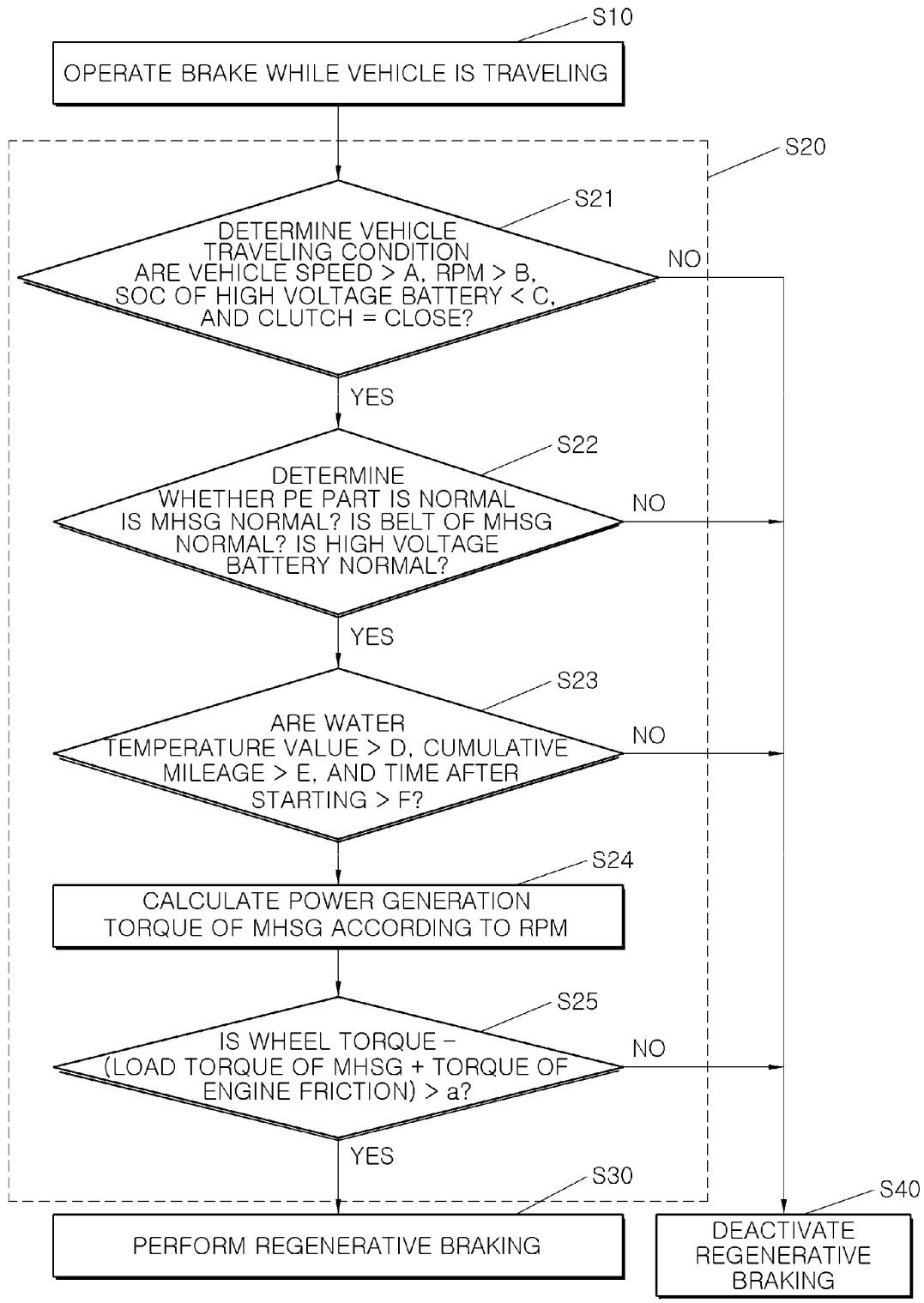

METHOD FOR EXECUTING REGENERATIVE BRAKING IN A MILD HYBRID SYSTEM

CROSS-REFERENCE TO RELATED APPLICATIONS

This application claims priority to and the benefit of Korean Patent Application No. 10-2017-0161691, filed on Nov. 29, 2017, which is incorporated herein by reference in its entirety.

BACKGROUND

Field of the Disclosure

The present disclosure relates to a vehicle having a mild hybrid system. More particularly, the present disclosure relates to a method for executing regenerative braking in a mild hybrid system.

Description of Related Art

FIG. 1A is a configurational diagram of a full hybrid electric vehicle (Full-HEV). FIG. 1B is a configurational diagram of a mild hybrid system. FIGS. 1A and 1B show a difference between the Full-HEV and the mild hybrid system.

Referring to FIGS. 1A and 1B, unlike the Full-HEV, the mild hybrid system should drive an engine together with a belt connected to the engine during regenerative braking in order to generate power with a mild hybrid starter and generator (MHSG). The belt may be omitted when the MHSG is directly connected to the engine.

As described above, the mild hybrid system is systemically different from the Full-HEV such that a transmission connection state in the mild hybrid system is also different from that in the Full-HEV during regenerative braking.

The Full-HEV may perform regenerative braking by releasing an engine clutch irrespective of the revolutions per minute (RPM) of an engine at a time when the regenerative braking begins. The Full-HEV may deliver a driving force to a motor after the regenerative braking is terminated, such that the regenerative braking may be performed even in an engine-off state.

In contrast, since a transmission and an engine of the mild hybrid system are directly connected during regenerative braking, the engine operates as friction during the regenerative braking such that the engine is possibly turned off in the worst case.

Since a main power source of the mild hybrid system is the engine, vehicle driving performance may be significantly affected when the engine is turned off due to the regenerative braking. When an engine is turned off, normal traveling of a vehicle is impossible such that an execution condition for regenerative braking in the mild hybrid system should be set different from that for regenerative braking in the Full-HEV.

SUMMARY

An embodiment of the present disclosure is directed to a method for executing regenerative braking in a mild hybrid system. The method is capable of maintaining vehicle driving performance, even when regenerative braking is performed, by setting an execution condition for preventing a starting off during the regenerative braking on the basis of a characteristic of the mild hybrid system.

Other objects and advantages of the present disclosure can be understood by the following description and become apparent with reference to the embodiments of the present disclosure. Also, may become apparent to those having ordinary skill in the art to which the present disclosure pertains that the objects and advantages of the present disclosure can be realized by the means as claimed and combinations thereof.

In accordance with an embodiment of the present disclosure, a method for executing regenerative braking of a mild hybrid system is disclosed. The method includes performing, when a brake is operated while a vehicle having the mild hybrid system is traveling, regenerative braking only in a state in which a wheel torque is greater than a clutch load torque by a threshold, thereby preventing occurrence of an abnormal engine-off state during regenerative braking.

In one example, the clutch load torque may be calculated as the sum of a load torque of a mild hybrid starter and generator (MHSG) and a torque of engine friction.

In one example, the method may further include, before the wheel torque and the clutch load torque are compared, determining a vehicle driving condition, determining whether a power electronics (PE) part is normal, and determining whether engine friction is stabilized.

In one example, the method may further include deactivating the regenerative braking when any one of the determination results of the vehicle driving condition, whether the PE part is normal, and whether the engine friction is stabilized is negative.

In one example, the determination of the vehicle driving condition may include determining whether a vehicle speed and a revolutions per minute (RPM) are above or more than corresponding predetermined values, determining whether a state-of-charge (SOC) of a high-voltage battery is less than a predetermined value, and determining whether a clutch is in a closed state. When any one of these determination results is negative, the deactivating of the regenerative braking may be performed.

In one example, the determination of whether the PE part is normal may include determining whether a MHSG operates normally, determining whether a belt of the MHSG is deteriorated, and determining whether a high-voltage battery operates normally. When any one of these determination results is negative, the deactivating of the regenerative braking may be performed.

In one example, the determination of whether the engine friction is stabilized may include determining whether a water temperature value, a cumulative mileage, and a starting time are above or more than corresponding reference values. When any one of these determination results is negative, the deactivating of the regenerative braking may be performed.

BRIEF DESCRIPTION OF THE DRAWINGS

FIG. 1A is a configurational diagram of a Full-HEV.

FIG. 3 is a flowchart illustrating a method for executing regenerative braking in a mild hybrid system according to the present disclosure.

DETAILED DESCRIPTION OF EMBODIMENTS

Hereinafter, a method for executing regenerative braking in a mild hybrid system according to the present disclosure is described in detail with reference to the accompanying drawings. However, where it is determined that known functions and configurations may unnecessarily obscure the gist of the present disclosure, detailed descriptions thereof have been omitted.

In a hybrid vehicle, a regenerative braking function is a core function to obtain improvement in fuel efficiency. After electric energy is recovered through regenerative braking, a motor is driven using redundant electric energy such that fuel efficiency can be improved.

However, owing to a systemic difference between the mild hybrid system and a Full-HEV, unlike in the Full-HEV, an engine and a MHSG of the mild hybrid system act as loads during regenerative braking.

Further, when the engine and the MHSG are connected through a belt, torque delivery may not be smooth when the belt is deteriorated.

Since the mild hybrid system is directly connected to a wheel and the engine, whether to perform regenerative braking is determined according to friction of a clutch level during regenerative braking. When an error occurs in calculation of the friction of the clutch level, a dangerous situation may occur in which the engine is turned off and thus a vehicle is stopped.

When the regenerative braking is not performed normally, improvement of fuel efficiency cannot be achieved. Also, phenomena such as an engine-off state and the like occur to cause dissatisfaction of consumers and deterioration of marketability.

Therefore, the provision of a regenerative braking execution condition for the mild hybrid systems other than the Full-HEV is required.

The mild hybrid system is in a state in which a wheel driving force drives the engine during regenerative braking. The MHSG connected to the engine generates electricity to convert a driving force of the wheel into electric energy. As engine friction and a load of an MHSG are increased, a force of the wheel, which is required for driving the engine, is increased.

Therefore, the mild hybrid system is required to determine loads resulting from the engine friction and loads of PE parts during regenerative braking.

Figure 1B:
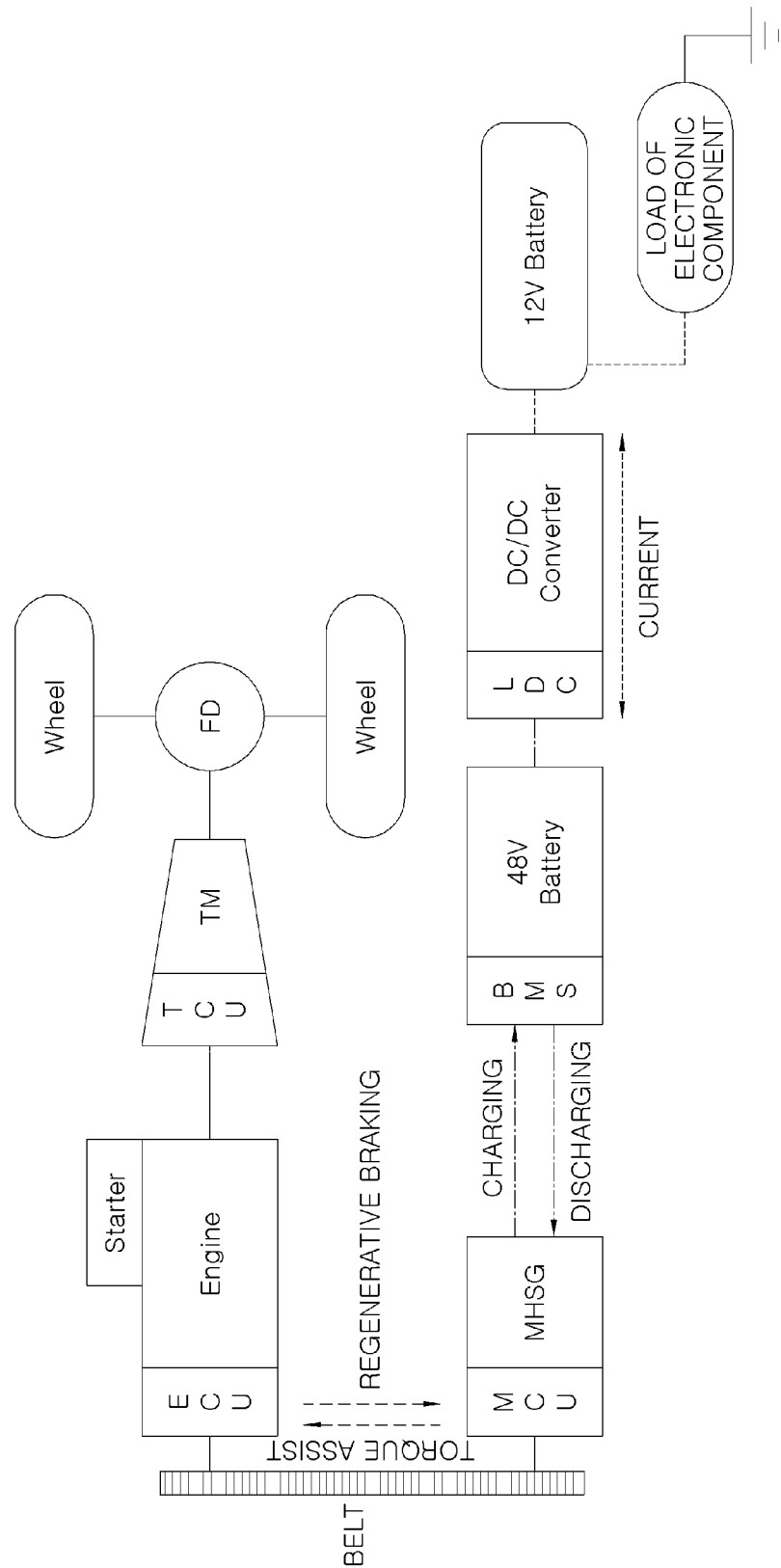
FIG. 1B is a configurational diagram of a mild hybrid system.
Figure 2:
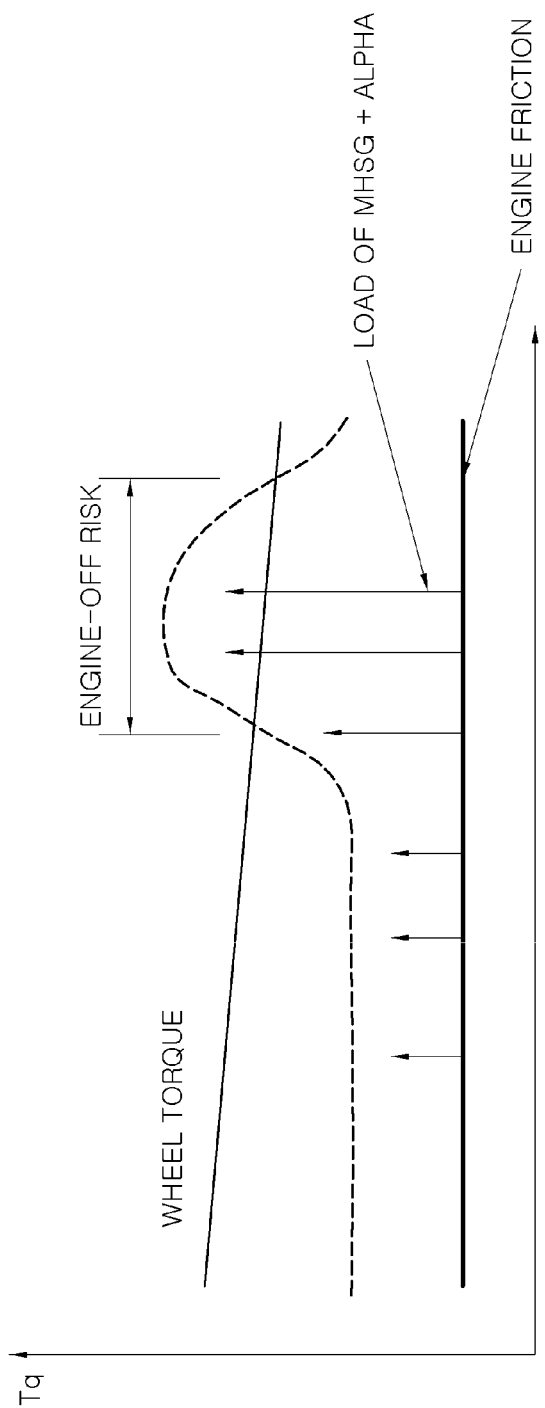
FIG. 2 is a graph illustrating a probability of an engine-off state according to a wheel torque and a clutch load torque during regenerative braking.

When the driving force of the wheel is less than the friction of the clutch level, the engine is turned off and the vehicle is in a stop state. Thus, the mild hybrid system predicts friction (including the load of an MHSG), which is applicable to a clutch during regenerative braking. When the mild hybrid system is not in a state of predicting the friction, performing regenerative braking may be dangerous (see FIG. 2).

The friction of the clutch level should be determined in consideration of an engine temperature, an MHSG belt condition, a cumulative mileage, MHSG diagnostic information, and the like.

FIG. 3 is a flowchart illustrating a method for executing regenerative braking in a mild hybrid system according to the present disclosure. Referring to FIG. 3, the method for executing regenerative braking in a mild hybrid system includes operating a brake (S10), determining a regenerative braking execution condition (S20), performing regenerative braking according to the result of the step of determining, and deactivating the regenerative braking (S40).

In the present disclosure, the step of determining of the regenerative braking execution condition (S20) includes determining whether a vehicle traveling condition is satisfied (S21), determining whether a PE part is normal (S22), determining whether engine friction is stabilized (S23), calculating a load torque of an MHSG, which is required for power generation (S24), and comparing a wheel torque with a clutch load torque, which is calculated by summing up the load torque of the MHSG and a torque of engine friction, to determine whether to execute regenerative braking (S25). In other words, this determination (S25) is whether the wheel torque minus the clutch load torque is above or more than a reference value (a).

Here, the step of determining satisfaction of the vehicle traveling condition (S21) includes determining whether a vehicle speed and an RPM are above or more than corresponding predetermined values (A) and (B), respectively, determining whether a SOC of a high-voltage battery is less than a predetermined value (C), and determining whether the clutch is in a closed state. When any one of these determination results is negative, the deactivating of the regenerative braking (S40) is performed. For example, when the SOC of the high voltage battery is above or more than a predetermined value (C), the regenerative braking is deactivated to prevent overheating of the high voltage battery, which results from overcharging.

The step of determining whether the PE part is normal (S22) determines failures of the PE part and a belt. The step determining whether the PE part is normal (S22) includes determining whether the MHSG operates normally, determining whether a belt of the MHSG is deteriorated, and determining whether the high-voltage battery operates normally. When any one of these determination results is negative, the deactivating of the regenerative braking (S40) is performed. For example, when the belt is deteriorated, energy recovery is difficult due to slip and the like. There is a possibility of an engine-off state due to an increased load resulting from the deteriorated belt, such that the regenerative braking is deactivated. Further, since an unintended torque of the MHSG is generated when the MHSG operates abnormally and thus there is a possibility of an engine-off state, the regenerative braking is deactivated. When the high voltage battery operates abnormally, overheating of the high voltage battery may be caused by charging on the basis of a calculation error of the SOC such that the regenerative braking is deactivated.

The step of determining whether the engine friction is stabilized (S23) includes determining whether a water temperature value, a cumulative mileage, and a starting time are above or more than corresponding reference values (D), (E), and (F), respectively. When any one of these determination results is negative, the regenerative braking is deactivated. The reason for determining the engine friction stabilization is that the engine friction may become large abnormally when an engine temperature is low or in an initial operating state after starting. When a cumulative mileage of an engine is low, engine friction is not yet stabilized.

In accordance with embodiments of the present disclosure, it is possible to prevent an abnormal engine-off state during regenerative braking by performing regenerative braking only when a wheel torque is greater than a clutch load torque by a threshold or more.

Further, in accordance with embodiments of the present disclosure, it is possible to induce a driver to inspect and repair PE parts by lighting a service lamp when regenerative braking cannot be executed.

Furthermore, in accordance with embodiments of the present disclosure, it is possible to maintain vehicle driving performance by preventing a starting off of an engine during regenerative braking of a mild hybrid system.

As described above, in accordance with embodiments of the present disclosure, it is possible to maintain vehicle driving performance even when regenerative braking is performed by providing an execution condition for preventing a starting off of an engine during regenerative braking on the basis of a characteristic of the mild hybrid system.

The embodiments disclosed herein, and the accompanying drawings, are used only for the purpose of easily describing the technical spirit of the present disclosure and are not intended to limit the scope of the present disclosure defined in the appended claims. Therefore, those having ordinary skill in the art will appreciate that various modifications and other equivalent embodiments can be derived without departing from the scope of the present disclosure.

What is claimed is:

1. A method for executing regenerative braking of a mild hybrid system, the method comprising:
    calculating a clutch load torque when a brake is operated while a vehicle having the mild hybrid system is traveling;
    comparing the clutch load torque with a wheel torque; and
    performing regenerative braking only in a state in which the wheel torque is greater than the clutch load torque by a threshold, thereby preventing occurrence of an abnormal engine-off state during regenerative braking.

2. The method of claim 1, wherein the clutch load torque is calculated as a sum of a load torque of a mild hybrid starter and generator (MHSG) and a torque of engine friction.

3. The method of claim 1, further comprising:
    before the wheel torque and the clutch load torque are compared, determining a vehicle driving condition, determining whether a power electronics (PE) part is normal, and determining whether engine friction is stabilized.

4. The method of claim 3, further comprising:
    deactivating the regenerative braking when a result of any one of determining the vehicle driving condition, determining whether the PE part is normal, and determining whether the engine friction is stabilized is negative.

5. The method of claim 3, wherein:
    determining the vehicle driving condition includes determining whether a vehicle speed and a revolutions per minute (RPM) are more than corresponding predetermined values, determining whether a state-of-charge (SOC) of a high-voltage battery is less than a predetermined value, and determining whether a clutch is in a closed state, and
    deactivating the regenerative braking when a result of any one of determining whether the vehicle speed and the RPM are more than corresponding predetermined values, determining whether the SOC of the high-voltage battery is less that the predetermined value, and determining whether the clutch is in the closed state is negative.

6. The method of claim 3, wherein:
    determining whether the PE part is normal includes determining whether a mild hybrid starter and generator (MHSG) operates normally, determining whether a belt of the MHSG is deteriorated, and determining whether a high-voltage battery operates normally, and
    deactivating the regenerative braking when a result of any one of determining whether the MHSG operates normally, determining whether the belt of the MHSG is deteriorated, and determining whether the high-voltage battery operates normally is negative.

7. The method of claim 3, wherein:
    determining whether the engine friction is stabilized includes determining whether a water temperature value, a cumulative mileage, and a starting time are more than corresponding reference values, and
    deactivating the regenerative braking when a result of any one of determining whether a water temperature value, a cumulative mileage, and a starting time are more than corresponding reference values is negative.

* * * * *